(12) United States Patent  (10) Patent No.: US 7,885,068 B2
Seo et al.  (45) Date of Patent: Feb. 8, 2011

(54) COOLOR FOR NOTEBOOK COMPUTER

(75) Inventors: Min Whan Seo, Seongnam (KR); Hee Jun Yang, Siheung (KR); Sang Jun Jung, Seoul (KR)

(73) Assignee: Zalman Tech Co., Ltd., Seoul (KR)

( * ) Notice: Subject to any disclaimer, the term of this patent is extended or adjusted under 35 U.S.C. 154(b) by 42 days.

(21) Appl. No.: 12/303,116

(22) PCT Filed: Jun. 5, 2007

(86) PCT No.: PCT/KR2007/002730

§ 371 (c)(1),
(2), (4) Date: Dec. 2, 2008

(87) PCT Pub. No.: WO2007/142455

PCT Pub. Date: Dec. 13, 2007

(65) Prior Publication Data

US 2009/0154089 A1   Jun. 18, 2009

(30) Foreign Application Priority Data

Jun. 5, 2006   (KR) ...................... 10-2006-0050493

(51) Int. Cl.
  *H05K 7/20* (2006.01)
(52) U.S. Cl. ....................... 361/695; 361/694
(58) Field of Classification Search ............... D14/447; 361/690, 679.46, 679.48–679.51, 694.695
See application file for complete search history.

(56) References Cited

U.S. PATENT DOCUMENTS 6,239,971 B1 *   5/2001   Yu et al. ..................... 361/695
6,259,601 B1 *   7/2001   Jaggers et al. .............. 361/690
6,459,574 B1 *   10/2002  Ghosh ..................... 361/679.46
6,707,668 B2 *   3/2004   Huang ..................... 361/679.48
6,894,896 B2 *   5/2005   Lin ............................ 361/695
7,177,150 B2 *   2/2007   Kazuhiro .................... 361/695
D555,162 S  *    11/2007  Park et al. .................. D14/447
7,301,765 B2 *   11/2007  Huang ........................ 361/695
7,388,745 B2 *   6/2008   DeLuga et al. .............. 361/690
2003/0058615 A1 *   3/2003   Becker et al. ............... 361/687
2005/0083650 A1     4/2005   Yang

FOREIGN PATENT DOCUMENTS

| JP | 7-311632 A | * 11/1995 |
| JP | 7311632 A | 11/1995 |
| JP | 14-196842 A | 7/2002 |
| JP | 14-215271 A | 7/2002 |
| TW | M262972 | 4/2005 |

* cited by examiner

*Primary Examiner*—Gregory D Thompson
(74) *Attorney, Agent, or Firm*—Jason Y. Pahng (57) ABSTRACT

Provided is a cooler for a notebook computer. The cooler includes: a body comprising an upper plate, a lower plate, and an air passage formed between the upper plate and the lower plate; one or more cooling fans mounted on the body and drawing air into the air passage; and one or more vent holes formed in portions of the upper plate other than portions of the upper plate over the cooling fans, wherein the air drawn by the cooling fan is flown through the air passage of the body and discharged through the vent holes to the notebook computer placed on the body of the cooler. Accordingly, the air drawn by the cooling fans is flown through the air passage of the body and discharged through the vent holes to the notebook computer placed on the body of the cooler, thereby cooling the notebook computer.

6 Claims, 7 Drawing Sheets

COOLER FOR NOTEBOOK COMPUTER

TECHNICAL FIELD

The present invention relates to a cooler for a notebook computer, and more particularly, to a cooler for a notebook computer, which can cool an entire bottom surface of the notebook computer using cooling fans.

BACKGROUND ART

In general, a cooler for a notebook computer props up the notebook computer and dissipates part of heat generated when the notebook computer operates by blowing air toward a bottom surface of the notebook computer.

Figure 1:
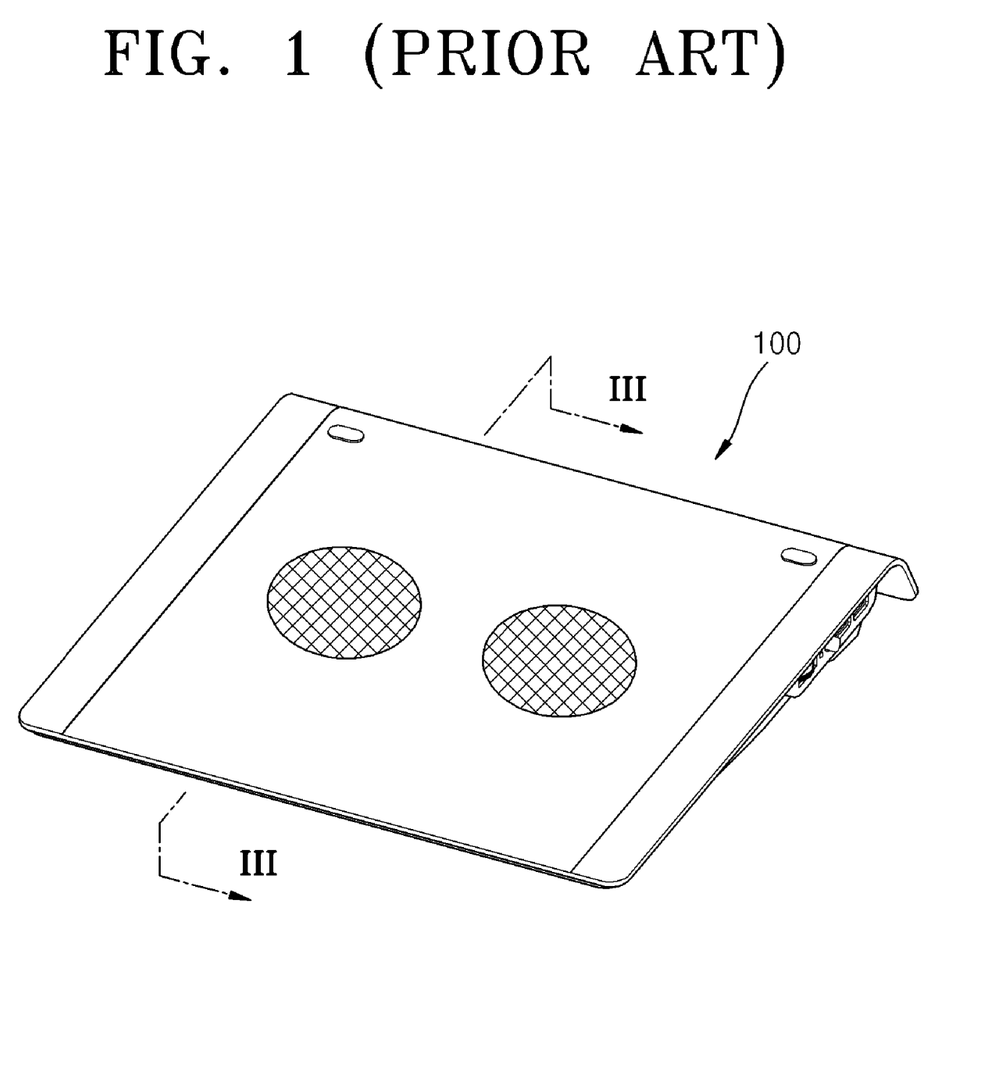
FIG. 1 is a perspective view of a conventional cooler for a notebook computer.
Figure 2:
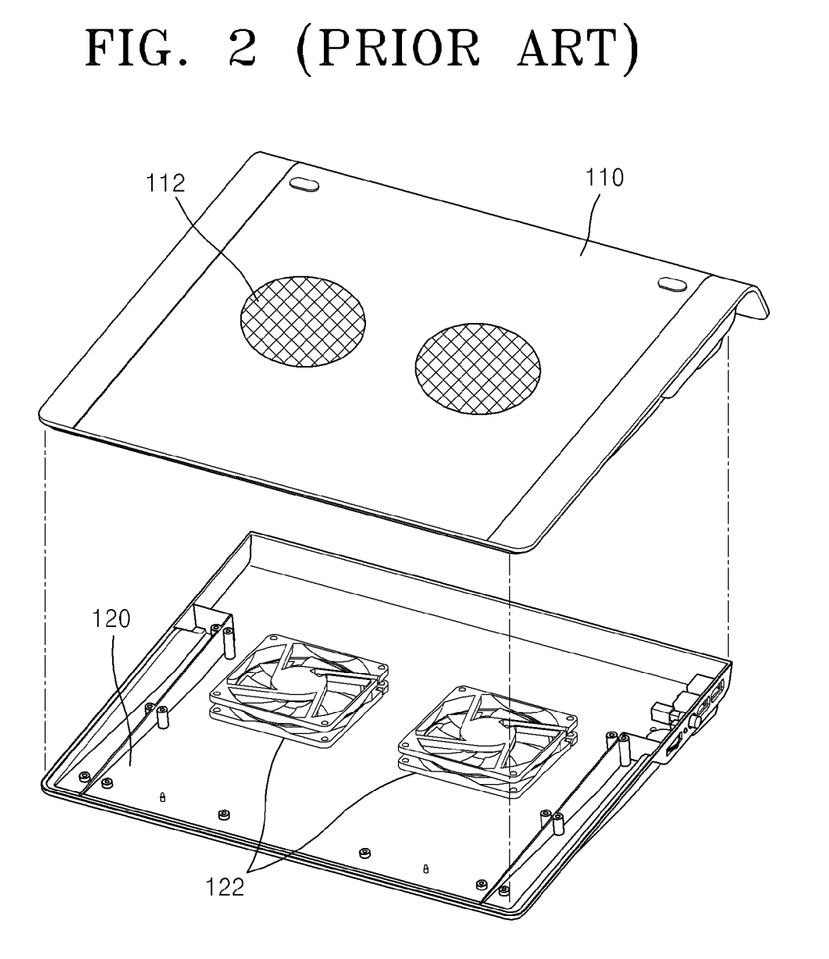
FIG. 2 is an exploded perspective view of the cooler of FIG. 1.
Figure 3:
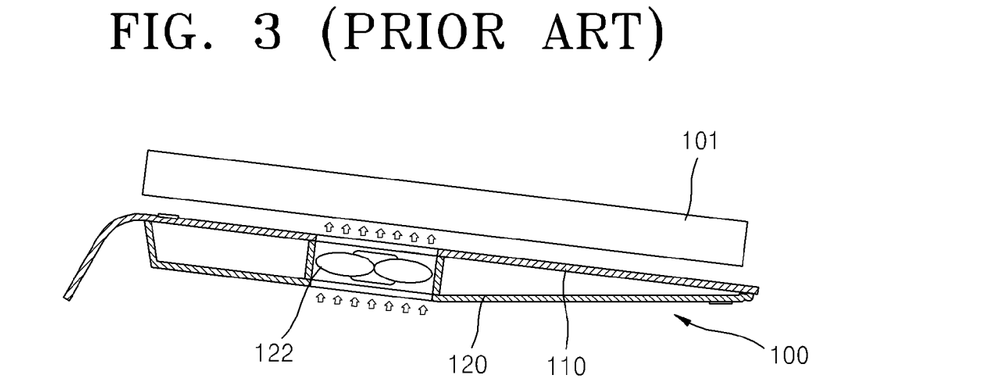
FIG. 3 is a side sectional view taken along line III-III of FIG. 1.

A conventional cooler 100 for a notebook computer 101 is shown in FIGS. 1 through 3.

The cooler 100 includes a body including an upper plate 110 and a lower plate 120. Two circular vent holes 112 are formed in the upper plate 110. Through-holes corresponding in position and size to the vent holes 112 are formed in the lower plate 120, and cooling fans 122 are disposed right over the through-holes of the lower plate 120.

FIG. 3 is a side sectional view illustrating the notebook computer 101 placed on the cooler 100. Referring to FIG. 3, air under the cooler 100 is blown up by the cooling fans 122. The air flow (wind) is indicated by arrows in FIG. 3. The notebook computer 101 is cooled by the air flow produced by the cooling fans 122.

DISCLOSURE OF INVENTION

Technical Problem

However, the conventional cooler 100 has a problem in that only specific central portions of a bottom surface of the notebook computer 101 are cooled. That is, the air blown up by the cooling fans 122, which are axial fans, into the cooler 101 is directly discharged through the vent holes 112 of the upper plate 110 to the bottom surface of the notebook computer 101. Accordingly, the entire area of the bottom surface of the notebook computer 101 is not cooled, but only portions of the bottom surface of the notebook computer 101 over the vent holes 112 are cooled. Referring to FIG. 3, the air exiting the vent holes 112 is moved to the upper left along the bottom surface of the notebook computer 101, thereby partially cooling the bottom surface of the notebook computer 101. Portions of the bottom surface of the notebook computer 101 with which the air collides are limited, thereby failing to obtain desired cooling effect. That is, since the vent holes 112 directly connected to the cooling fans 122 are formed in only central portions of the upper plate 110, effective cooling cannot be achieved.

Technical Solution

The present invention provides a cooler for a notebook computer, which can cool the entire notebook computer.

According to an aspect of the present invention, there is provided a cooler for a notebook computer, the cooler comprising: a body comprising an upper plate, a lower plate, and an air passage formed between the upper plate and the lower plate; one or more cooling fans mounted on the body and drawing air into the air passage; and one or more vent holes formed in portions of the upper plate other than portions of the upper plate over the cooling fans, wherein the air drawn by the cooling fan is flown through the air passage of the body and discharged through the vent holes to the notebook computer placed on the body of the cooler.

The cooling fans may be blower fans that are installed on the lower plate and enable air to be drawn up into the air passage and flown through the air passage, wherein the one or more vent holes are formed in portions of the upper plate including at least front portions of the upper plate, the cooler further comprising a wind blocking part formed along a front edge of the upper plate, and when the notebook computer is placed on the upper plate, preventing the air discharged through the vent holes into a space between a bottom surface of the notebook computer and the upper plate from proceeding toward the front of the notebook computer.

A plurality of vent holes each having a circular shape may be formed behind the wind blocking part to cover more than half of the entire area of the upper plate.

The plurality of vent holes may be formed through the upper plate in a direction parallel to a direction the air drawn by the cooling fan is flown.

The one or more vent holes may be formed adjacent to the back of the wind blocking part and have a long narrow shape along the wind blocking part.

The cooling fans may be one or more axial fans that enable air to be drawn into the air passage and flown through the air passage.

Advantageous Effects

As described above, the notebook computer according to the present invention enables air to uniformly collide with the bottom surface of the notebook computer, thereby more effectively cooling the notebook computer when compared with its conventional counterpart.

DESCRIPTION OF DRAWINGS

The above and other features and advantages of the present invention will become more apparent by describing in detail exemplary embodiments thereof with reference to the attached drawings in which.

BEST MODE

The present invention will now be described more fully with reference to the accompanying drawings, in which exemplary embodiments of the invention are shown.

Figure 4:
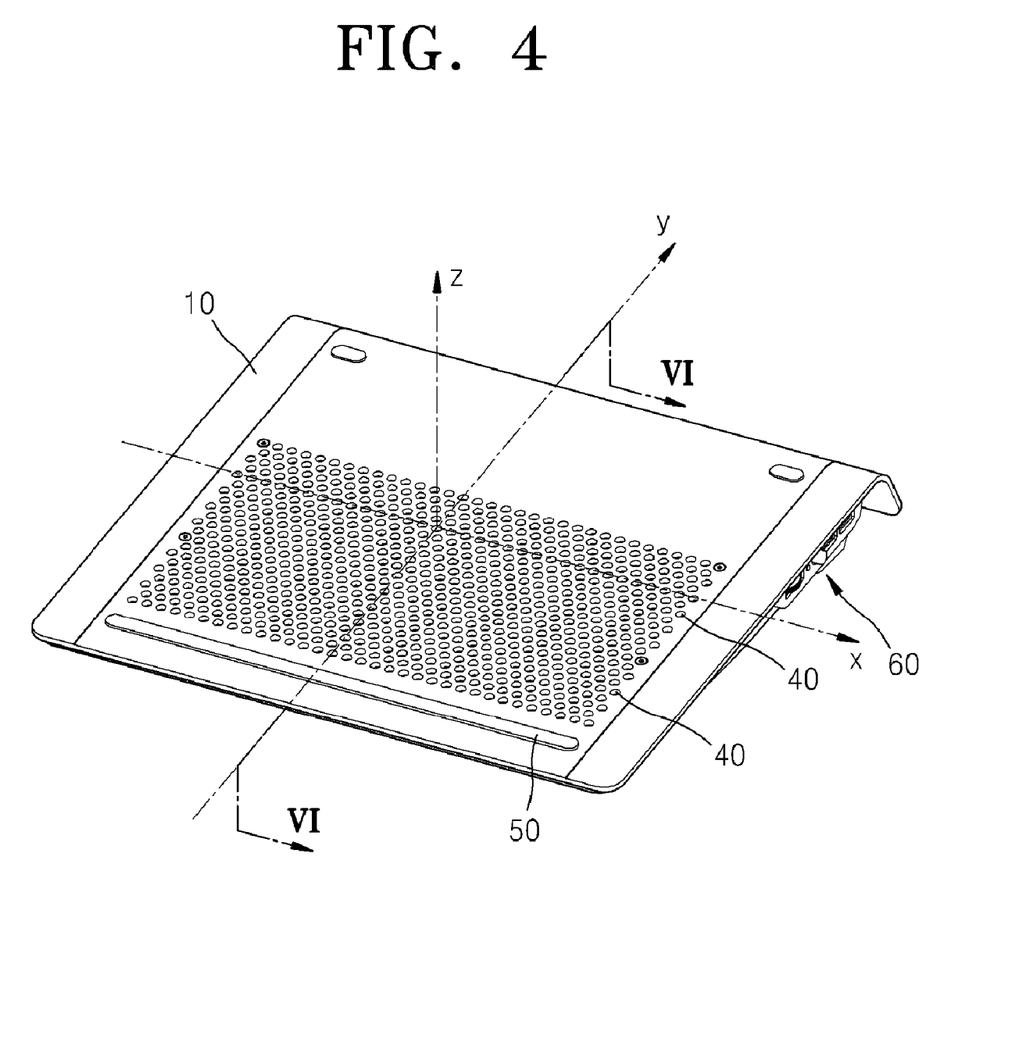
FIG. 4 is a perspective view of a cooler for a notebook computer according to an embodiment of the present invention.
Figure 5:
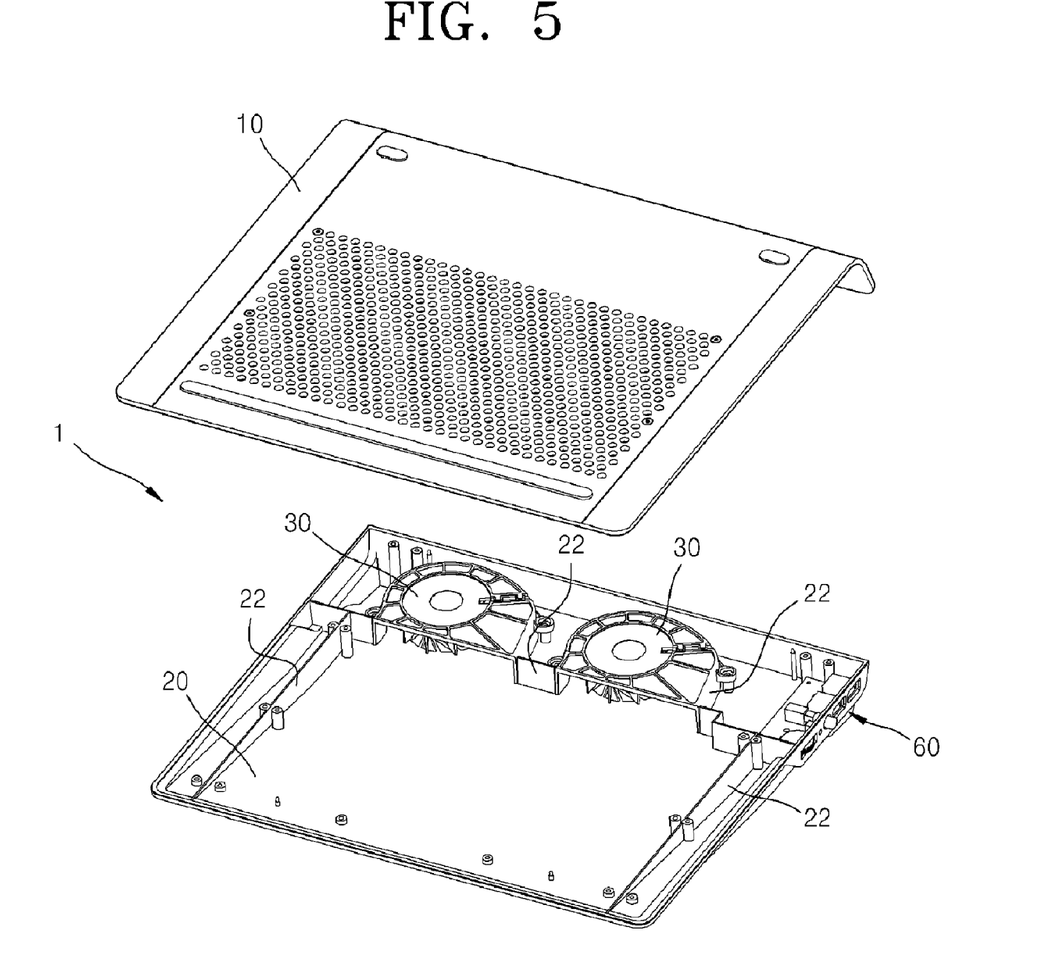
FIG. 5 is an exploded perspective view of the cooler of FIG. 4.
Figure 6:
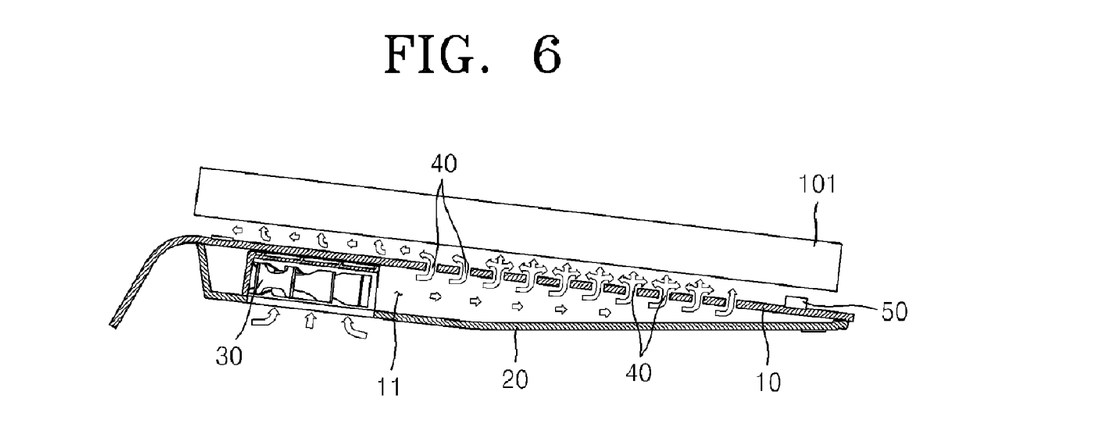
FIG. 6 is a side sectional view taken along line VI-VI of FIG. 4.

FIG. 4 is a perspective view of a cooler 1 for a notebook computer 101 according to an embodiment of the present invention. FIG. 5 is an exploded perspective view of the cooler 1 of FIG. 4. FIG. 6 is a side sectional view taken long line VI-VI of FIG. 4.

Referring to FIGS. 4 and 5, the cooler 1 includes a body including an upper plate 10 and a lower plate 20, cooling fans 30, vent holes 40, and a wind blocking part 50.

The terms used in the specification will be defined first before the present invention is explained. Based on x, y, and z axes of FIG. 4, a "front side" is a side in a negative direction of the y axis, which is closer to a user of the notebook computer 101, a "rear side" is a side in a positive direction of the y axis, and an "upper side" is a side in a positive direction of the z axis. Considering that the upper plate 10 is divided into four quarters by the x and y axes, portions of the upper plate 10 corresponding to third and fourth quarters are called "front portions" and portions of the upper plate 10 corresponding to the first and second quarters are called "rear portions".

The upper plate 10 props up the notebook computer 101 (see FIG. 6) such that the notebook computer 101 rests on the upper plate 10. A rear end of the upper plate 10 is bent and downwardly extends.

The lower plate 20 is coupled to the upper plate 10 to form an air passage 11. The air passage 11 acts as a duct for guiding air drawn by the cooling fans 30. Accordingly, barrier walls 22 are provided on both sides of the lower plate 20 and around the cooling fans 30 to form the air passage 11 when the lower plate 20 is coupled to the upper plate 10.

The cooling fans 30 are mounted on rear portions of the body and adapted to blow air into the air passage 11 such that the air is flowed through the air passage 11. While two cooling fans 30 are installed on the rear portions of the body in FIGS. 4 through 6, the cooling fans 30 are not limited to their positions and number as long as they can blow air into the air passage 11.

Referring to FIGS. 5 and 6, the cooling fans 30 are blower fans that can draw air up into the air passage 11. The air drawn up by the cooling fans 30 is horizontally flown through the air passage 11 to the front side. Since all sides of the air passage 11 except the front side are blocked by the barrier walls 22, the air drawn by the cooling fans 30 is flown through the air passage 11 only to the front side. The blower cooling fans 30 advantageously can produce higher pressure than axial fans when both the fans have similar sizes. Also, the blower cooling fans 30 can reduce the total height of the cooler 1.

The vent holes 40 are formed in portions of the upper plate 10 other than portions over the cooling fans 30. That is, since the cooling fans 30 are formed on the rear portions of the body, the vent holes 40 are not formed in rear portions of the upper plate 10 over the cooling fans 30 and are formed in front portions of the upper plate including at least a portion adjacent to the wind blocking part 50.

The plurality of vent holes 40 are formed over the front portions and part of the rear portions of the upper plate 10. Referring to FIG. 4, the plurality of small circular vent holes 40 are arranged lengthwise and crosswise over the third and fourth quarters and part of the first and second quarters adjacent to the x and y axes. In detail, the vent holes 40 are formed behind the wind blocking part 50 to cover more than half of the entire area of the upper plate 10. When the notebook computer 101 is placed on the upper plate 10, the vent holes 40 face most portions of a bottom surface of the notebook computer 101 except rear portions of the bottom surface.

The wind blocking part 50 is disposed at a position slightly spaced rearwardly from a front edge of the upper plate 10. The wind blocking part 50 has a band shape and is typically formed of a rubber material. When the notebook computer 101 is placed on the upper plate 10, the wind blocking part 50 prevents the air discharged through the vent holes 40 into a space between the bottom surface of the notebook computer 101 and the upper plate 10 from proceeding to the front of the notebook computer 101. That is, since the wind blocking part 50 prevents the air drawn by the cooling fans 30 and exiting the vent holes 40 from proceeding to the front of the notebook computer 101, the user located in front of the notebook computer 101 can use the notebook computer 101 in a comfortable, pleasant atmosphere.

Referring to FIG. 5, a control unit 60 is disposed on a side surface of the cooler 1. The control unit 60 is provided with a speed controller controlling the speed of the cooling fans 30, a terminal receiving power from the notebook computer 101 via a USB terminal, and a light emitter displaying an operational state.

The cooler 1 constructed as described above can cool the entire area of the notebook computer 101 since the air drawn by the cooling fans 30 and flown through the air passage 11 formed in the body is uniformly discharged through the plurality of vent holes 40, e.g., hundreds of vent holes, formed over large portions of the upper plate 10 to the bottom surface of the notebook computer 101.

In detail, referring to FIG. 6, air is strongly drawn up by the blower cooling fans 30 into the air passage 11, which acts as a duct formed in the body, flown through the air passage 11, and then discharged through the hundreds of vent holes 40 to the bottom surface of the notebook computer 101 such that the air uniformly collides with the bottom surface of the notebook computer 101, thereby cooling the notebook computer 101. Part of the air discharged through the vent holes 40 which travels forward is blocked by the wind blocking part 50 and thus most of the air discharged through the vent holes 40 is guided rearward. While the air is flown between the bottom surface of the note book computer 101 and the upper plate 10 towards the rear side, the notebook computer 101 is continuously cooled.

MODE FOR INVENTION

Figure 7:
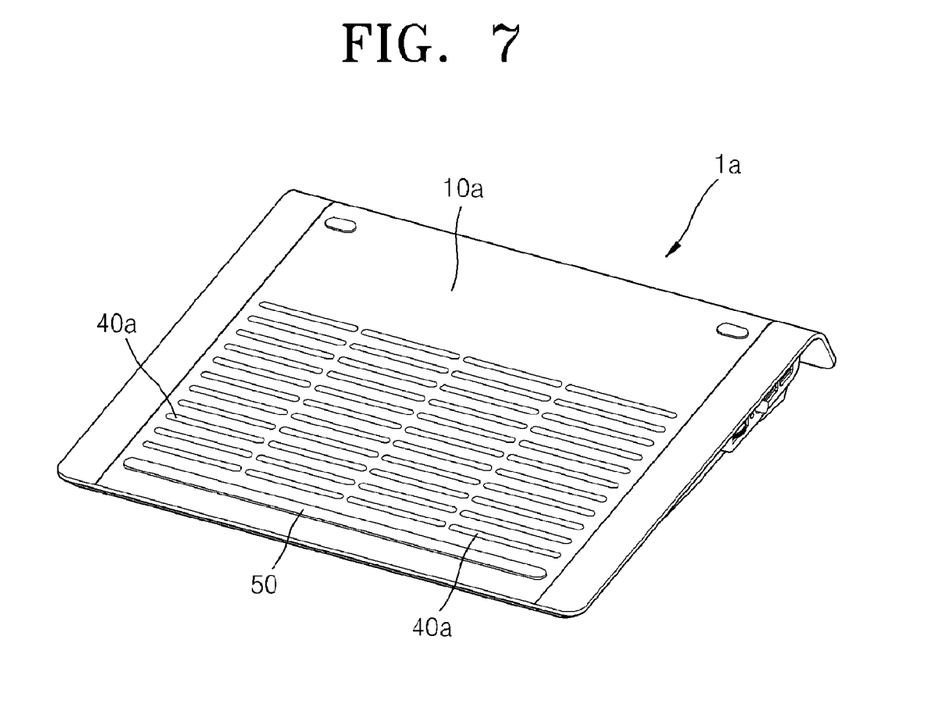
FIG. 7 is a perspective view of a cooler for a notebook computer according to another embodiment of the present invention.

FIG. 7 is a perspective view of a cooler 1a for a notebook computer 101 according to another embodiment of the present invention. Referring to FIG. 7, vent holes 40a formed in an upper plate 10a have long narrow shapes, different from the circular shapes of the vent holes 40a of FIGS. 4 through 6.

Since an area of the upper plate 10a of FIG. 7 covered by the vent holes 40a is similar to that covered by the vent holes 40 of FIGS. 4 through 6 and the cooler 1a of FIG. 7 are similar in other configurations to those of the cooler 1 of FIGS. 4 through 6, a detailed explanation of the cooler 1a will not be given.

Figure 8:
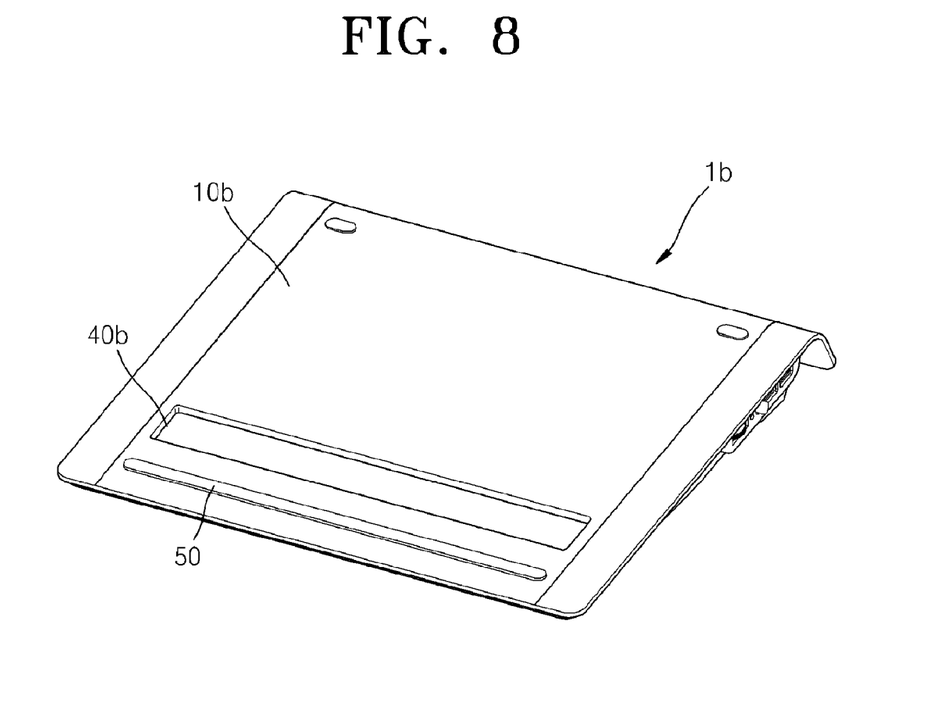
FIG. 8 is a perspective view of a cooler for a notebook computer according to another embodiment of the present invention.

FIG. 8 is a perspective view of a cooler 1b for a notebook computer 101 according to another embodiment of the present invention. The cooler 1b of FIG. 8 has one vent hole 40b having a shape different from those of the vent holes 40 and 40a of FIGS. 4 through 6.

Figure 9:
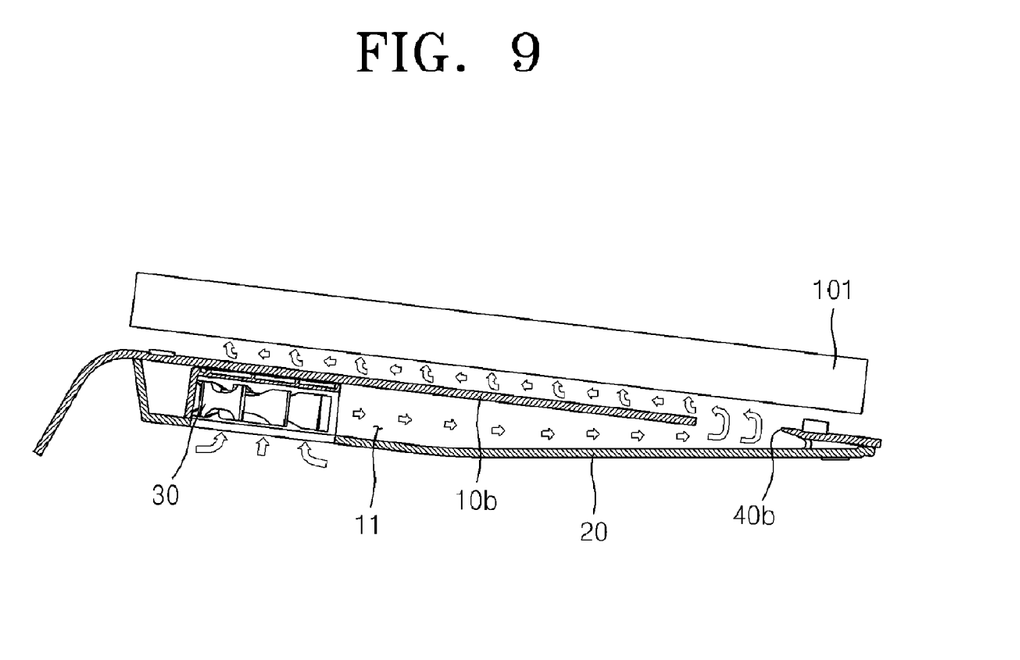
FIG. 9 is a side sectional view of the cooler of FIG. 8.

Referring to FIG. 8, one long narrow vent hole 40b is formed through an upper plate 10b just behind a wind blocking part 50. The area of the vent hole 40a is considerably large. FIG. 9 is a side sectional view of the cooler 1b of FIG. 8.

Referring to FIG. 9, air is drawn by a cooling fan 30 into an air passage 11, flown through an air passage 11, which acts as a duct in a body, and blocked by a front wall to be discharged through the vent hole 40b to a bottom surface of the notebook computer 101 and then proceed rearward. The discharged air collides with the bottom surface of the notebook computer 101 placed on the upper plate 10b in a direction from the front to the back of the bottom surface of the notebook computer 101.

Figure 10:
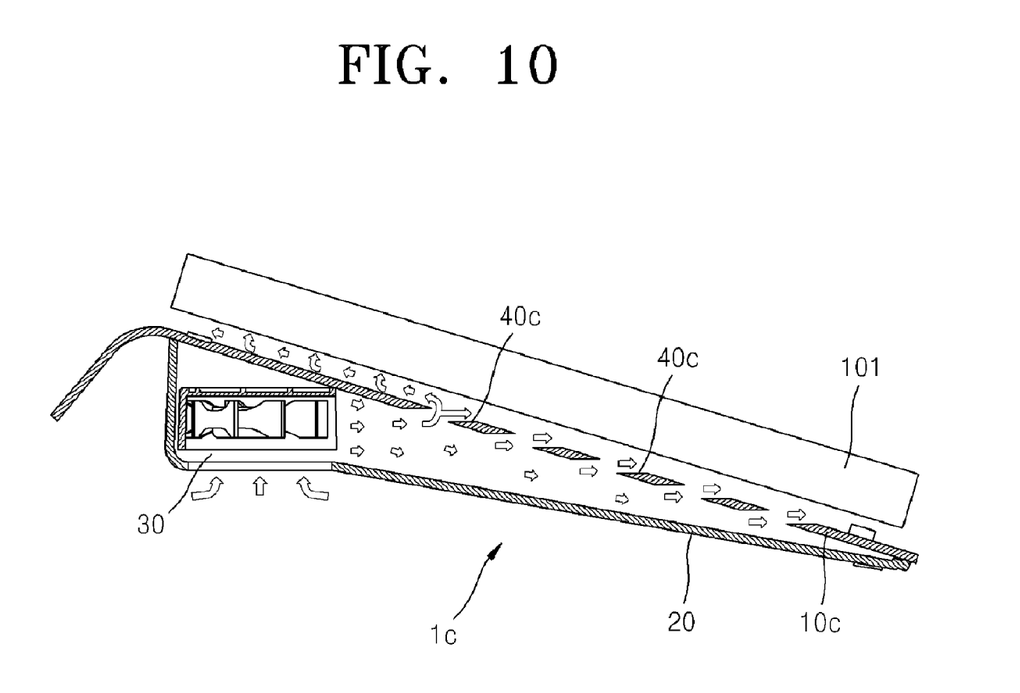
FIG. 10 is a side sectional view of a cooler for a notebook computer according to another embodiment of the present invention.

FIG. 10 is a side sectional view of a cooler 1c for a notebook computer 101 according to another embodiment of the present invention.

Referring to FIG. 10, vent holes 40c are formed in an upper plate 10 in a direction substantially parallel to a direction in which air drawn by cooling fans 30 is flown, differently from the vent holes 40 and 40a of FIGS. 4 through 7 which are respectively formed in the upper plates 10 and 10a in a direction perpendicular to a direction in which air is flown.

In detail, referring to FIG. 10, since the vent holes 40c are horizontally formed and the air drawn by the cooling fans 30 directly passes through the vent holes 40c, the air collides with a bottom surface of the notebook computer 101, which is placed on an upper plate 10c, with higher pressure, thereby attaining effective heat exchange.

Figure 11:
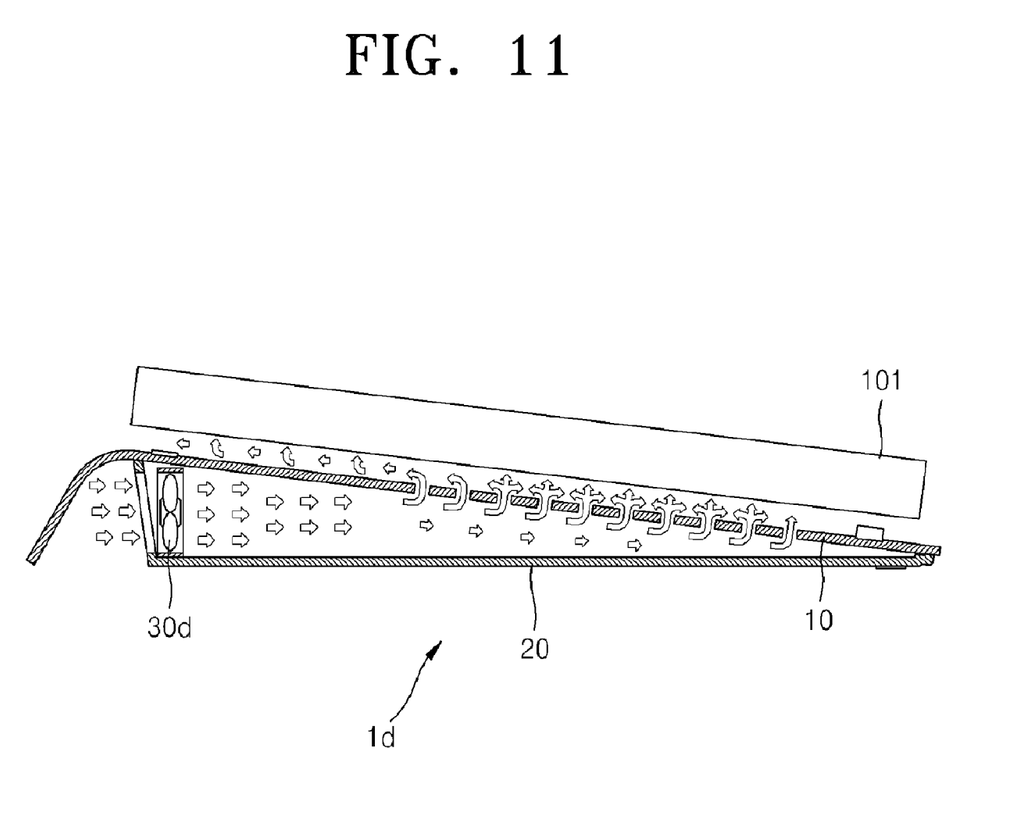
FIG. 11 is a side sectional view of a cooler for a notebook computer according to another embodiment of the present invention.

FIG. 11 is a side sectional view of a cooler 1d for a notebook computer 101 according to another embodiment of the present invention.

Referring to FIG. 11, the cooler 1d includes a plurality of axial cooling fans 30d, differently from the blower cooling fans 30 of the coolers 1, 1a, 1b, and 1c of FIGS. 4 through 10. The plurality of axial cooling fans 30 are installed on rear portions of a body. Differently from a conventional cooler using axial fans which draws up air into an air passage and then directly discharges the same, the cooler 1d of FIG. 11 draws air up into an air passage 11 formed in a body and allows the air to be flown through the air passage 11 similarly to the coolers 1, 1a, 1b, and 1c of FIGS. 4 through 10.

As described above, the notebook computer according to the present invention enables air to uniformly collide with the bottom surface of the notebook computer, thereby more effectively cooling the notebook computer when compared with its conventional counterpart.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A cooler for a notebook computer, the cooler comprising:
    an upper plate, a lower plate, and an air passage formed between the upper plate and the lower plate;
    one or more cooling fans drawing air into the air passage along a substantially vertical direction,
    wherein the one or more cooling fans are located between the upper plate and the lower plate at an edge or near an edge of the lower plate,
    wherein each of the one or more cooling fans rotate about a substantially vertical axis; and
    one or more vent holes formed in the upper plate,
    wherein the air drawn in by the one or more cooling fans are flown out through the air passage in a substantially horizontal direction and discharged through the one or more vent holes in order to cool a notebook computer placed on the upper plate.

2. The cooler of claim 1, wherein the one or more cooling fans draw air into the air passage along a vertical direction and wherein each of the one or more cooling fans rotate about a vertical axis.

3. A cooler for a notebook computer, the cooler comprising:
    an upper plate including one or more vent holes;
    a lower plate including one or more air inlet holes, wherein the upper plate and the lower plate define an air passage to allow air to flow from the air inlet holes to the one or more vent holes, wherein the one or more air inlet holes are located at an edge or near an edge of the lower plate; and
    one or more cooling fans drawing air into the air passage along a substantially vertical direction,
    wherein the air drawn in by the one or more cooling fans are flown out through the air passage in a horizontal direction and discharged through the one or more vent holes in order to cool a notebook computer placed on the upper plate.

4. The cooler of claim 1, wherein the one or more cooling fans draw air into the air passage along a vertical direction.

5. A cooler for a notebook computer, the cooler comprising:
    an upper plate including one or more vent holes;
    a lower plate including one or more air inlet holes, wherein the upper plate and the lower plate define an air passage to allow air to flow from the air inlet holes to the one or more vent holes, wherein the one or more air inlet holes are located at an edge or near an edge of the lower plate;
    one or more cooling fans located on the lower plate covering the one or more air inlet holes, wherein the one or more cooling fans are located between the upper plate and the lower plate, wherein the one or more cooling fans draw air into the air passage along a substantially vertical direction; and
    wherein the air drawn in by the one or more cooling fans are flown out through the air passage in a substantially horizontal direction and discharged through the one or more vent holes in order to cool a notebook computer placed on the upper plate.

6. The cooler of claim 5, wherein the one or more cooling fans draw air into the air passage along a vertical direction.

* * * * *